June 5, 1934.  W. B. BARNES  1,961,326
FREEWHEEL CONTROL
Filed June 15, 1931  4 Sheets-Sheet 1

Inventor
WILLIAM B. BARNES,
By Ashley Trask
Attorneys

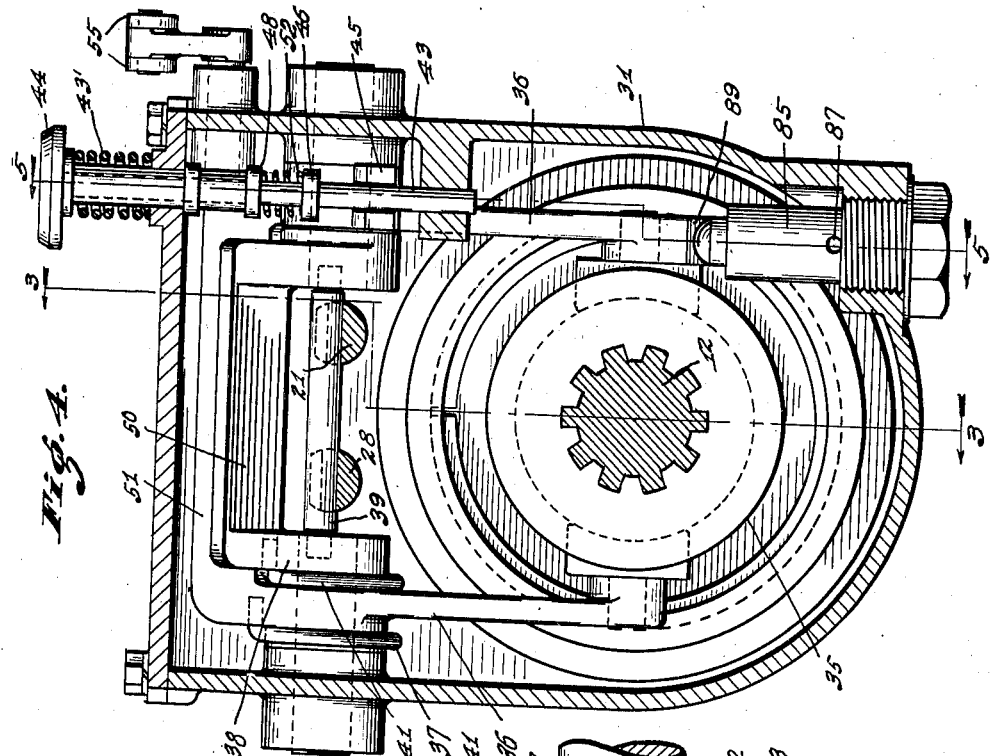
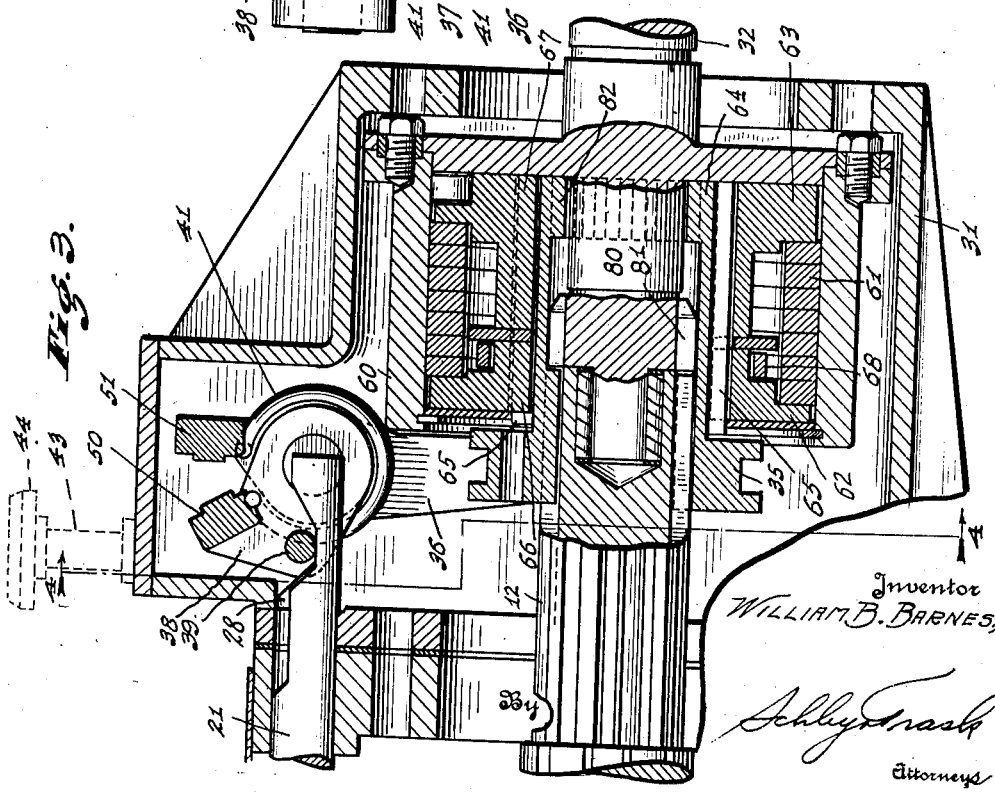

June 5, 1934.  W. B. BARNES  1,961,326
FREEWHEEL CONTROL
Filed June 15, 1931     4 Sheets-Sheet 3

Inventor
WILLIAM B. BARNES,
By Ashley Trask
Attorneys

June 5, 1934.  W. B. BARNES  1,961,326
FREEWHEEL CONTROL
Filed June 15, 1931   4 Sheets-Sheet 4

INVENTOR.
BY William B Barnes
ATTORNEY

Patented June 5, 1934

1,961,326

UNITED STATES PATENT OFFICE 1,961,326

FREEWHEEL CONTROL

William B. Barnes, Indianapolis, Ind.

Application June 15, 1931, Serial No. 544,320

6 Claims. (Cl. 192—48)

My invention is concerned with automobiles provided with an overrunning or "free-wheel" clutch, and particularly with such automobiles in which the free-wheel clutch is located without the change-speed transmission mechanism.

Free-wheel clutches are regarded as affording two distinct advantages in the operation of automobiles. In the first place, such a clutch serves to disconnect the engine from the drive wheels of the automobile when the drive wheels tend to rotate at a speed greater than that at which they would be driven by the engine. In the second place, such a clutch serves to decrease the mass that must be accelerated or decelerated to secure the synchronization which is necessary in the operation of changing gears in the transmission.

Because it is necessary when driving the automobile in reverse and possibly desirable at other times to eliminate the free-wheeling effect, it is customary to associate with the free-wheel clutches of the type with which this invention is concerned a manually operated lock-out device by means of which the two parts between which the free-wheel clutch operates are positively locked together irrespective of the direction in which they tend relatively to rotate. When such a lock-out device is functioning, the advantage in respect to easy gear-shifting which accompanies the use of a free-wheel clutch is lost.

It is the object of my invention to provide a free-wheel clutch with control devices of such a nature that the free-wheel clutch can be locked out of operation without losing the advantages in easy gear-shifting which the free-wheel clutch provides. A further object of my invention is to provide for a free-wheel clutch a positive lock-out device in which the possibility of clashing between intermeshing parts is eliminated. A still further object of my invention is to produce a free-wheel clutch which has certain advantages that will be brought out hereinafter.

In carrying out my invention I prefer to mount the free wheel clutch between the change-speed transmission and the drive wheels or propeller shaft of the automobile, that is, rearwardly of the transmission, and to provide for the free wheel clutch a lock-up mechanism, operable both by manual and automatic means to selectively provide a one-way or a two-way drive between the transmission and the driving wheels.

The accompanying drawings illustrate a preferred mechanical embodiment of the invention and a somewhat modified form thereof. The drawings are for the purpose of illustration only and are not to be taken as limiting the invention beyond the reasonable range of equivalents.

In the drawings:

Figure 3 is a longitudinal sectional view of my improved free wheeling clutch taken on the line 3—3 of Figure 4.

Figure 4 is a transverse sectional view taken on the line 4—4 of Figure 3.

Figure 1:
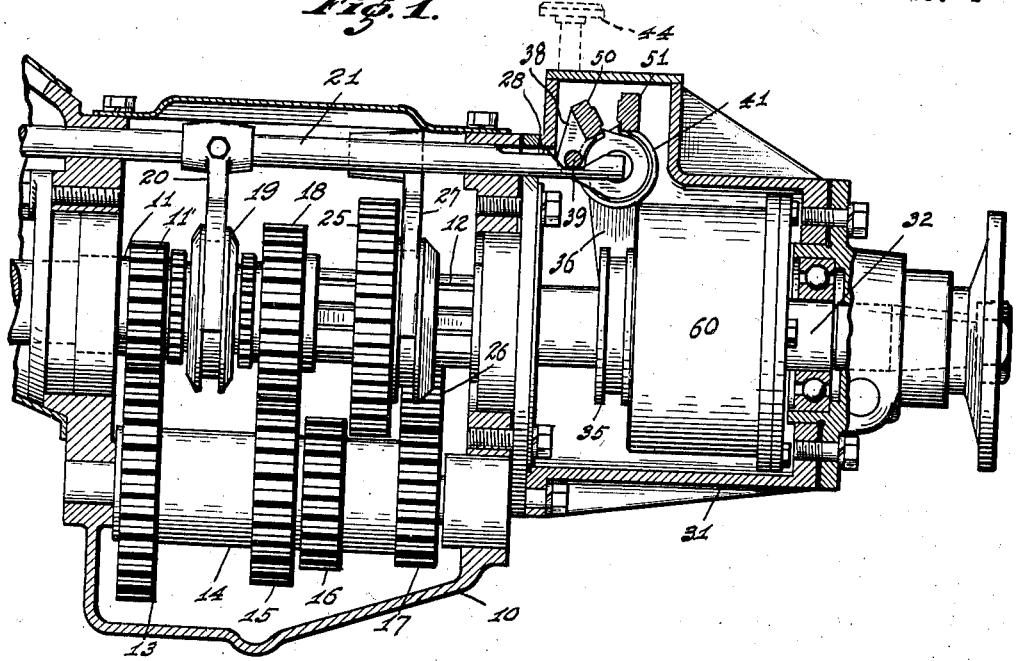
Figure 1 is a longitudinal sectional view through a change-speed transmission, showing a free wheeling clutch constructed according to the idea of this invention applied thereto.

Referring to the drawings in detail, and particularly to Figure 1, I have illustrated a change-speed transmission of the sliding gear type having a casing 10 in which are rotatably mounted two aligned shafts 11 and 12, the former being driven from the automobile engine through the usual engine clutch (not shown) and the latter, which is the main shaft or transmission shaft, being connected to the drive wheels of the automobile through the free wheeling clutch, the usual propeller shaft and other mechanisms, not illustrated. The drive shaft 11 is provided with a pinion 11' which meshes with a gear 13 formed on a countershaft sleeve 14 rotatably mounted in the casing 10. The countershaft sleeve 14 is also provided with change-speed gears 15, 16 and 17.

In the particular form of transmission illustrated, a gear 18 is rotatably mounted on the transmission shaft 12 and is constantly in mesh with the gear 15 on the countershaft sleeve 14.

Figure 6:
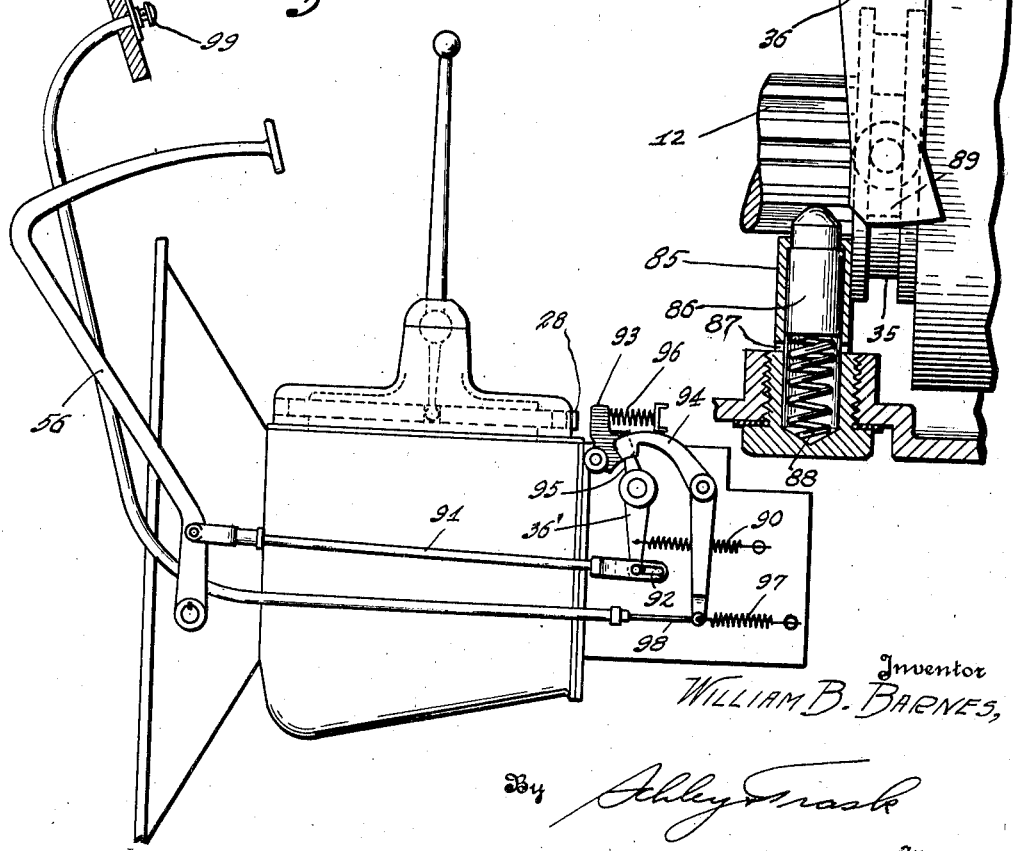
Figure 6 is a side elevational view of a transmission casing, a free wheel clutch casing and certain other related parts showing a modified form of control for the free wheeling clutch lock-up.
Figure 7:
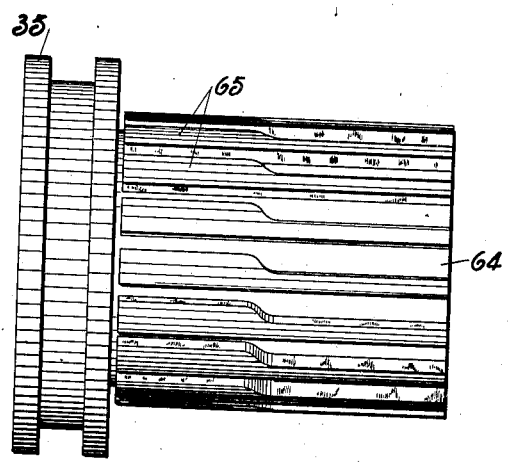
Figure 7 is an elevational view of the sleeve member which is slidably but non-rotatably mounted on the transmission shaft.
Figure 8:
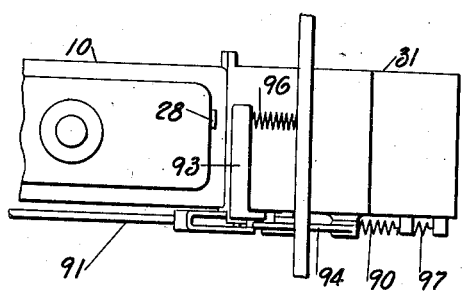
Figure 8 is a fragmentary top plan view of the transmission casing, free wheel clutch casing and related parts associated therewith.

A second gear 25 is slidably but non-rotatably mounted upon the transmission shaft 12 and is adapted to selectively engage either the gear 16 or the idler pinion 26 upon axial motion thereof upon the transmission shaft to provide first speed and reverse speed drives respectively. Slidably but non-rotatably mounted upon the transmission shaft between the gear 11' and the gear 18 is a clutch element 19 adapted upon axial movement thereof on the transmission shaft to selectively lock the transmission shaft against rotation relative to the gear 11' or the gear 18, to provide third and second speed drives respectively. The clutch element 19 is adapted to be moved upon the transmission shaft by a shifter fork 20 rigidly secured to a shifter rod 21 which extends longitudinally through the upper portion of the transmission casing. The gear 25 is adapted to be moved axially upon the transmission shaft by means of a shifter fork 27 rigidly connected to a shifter rod 28 which extends through the upper portion of the transmission casing parallel to the shifter rod 21, the shifter rods 21 and 28 being engaged by a suitable manually actuated gear shift lever such as is illustrated in Figure 6.

While I have described and illustrated a particular transmission mechanism, it is to be understood that the free wheeling clutch comprising the subject matter of this invention may be used with any form of transmission mechanism with which it can be suitably combined.

From a further inspection of Figure 1, it will be observed that the transmission shaft 12 is connected with an aligned tail-shaft 32 by means of a free wheeling clutch device contained in a casing 31 secured to the rear end of the transmission casing 10. The tail-shaft 32 is adapted to be connected to the propeller shaft, not shown.

This free wheeling clutch comprises a sleeve-like member 35 terminating in a shift collar slidably but non-rotatably mounted upon the splined rear end of the transmission shaft 12. This member 35 is adapted to be moved axially of the shaft 12 by means of a shifter fork 36 which is pivotally mounted on a transverse axis in the casing 31 above the free wheeling clutch. The construction and mounting of the shifter fork 36 is particularly illustrated in Figure 4 and from an inspection of this figure it will be observed that, I have provided means for operating the free wheeling lock-up device upon actuation of the shifter rods 21 and 28, which comprises an intermediate member 38 pivotally mounted upon the same axis as the shifter fork 36 and provided with an abutment pin 39 which extends transversely across and above the rear ends of the shifter rods 21 and 28. At a short distance from their rear ends, the shifter rods are respectively provided in their upper surface with notches (see Fig. 3), the sides of which are inclined to form cam faces cooperating with the pin 39 to swing the member 38 about its axis of pivotal mounting as the shifter rods are moved longitudinally, the notches in the shifter rods being so arranged that the pin 39 occupies a position at the bottom of the notches when the change-speed transmission is in neutral, as illustrated in Figure 1.

Referring particularly to Figures 3 and 4, it will be observed that the member 38 is freely movable through a limited arc relative to the shifter fork 36, except for the loop-string 41 which resiliently connects these two members together so that when either of the shifter rods 21 or 28 is moved to raise the pin 39 and rotate the member 38 about its pivotal axis the spring 41 will tend to transmit the rotational movement of the member 38 to the shifter fork 36, thereby moving the lower end of the shifter fork and the member 35 to the left as viewed in Figure 3. A second loop-spring 37 is interposed between the shifter fork 36 and the fixed casing 31 which tends to resiliently urge the lower end of the shifter fork and the member 35 to the right as viewed in Figure 3. Upon movement of either one of the shifter rods 21 or 28 from its neutral position, the pin 39 will engage with the inclined face on the respective shifter rod to rotate the member 38 in a clockwise direction, which with the cooperation of the spring 41 will rotate the shifter fork 36 in the same direction, compressing the spring 37 to thereby move the lower end of the shifter fork 36 and the member 35 to the left.

The construction so far described comprises the automatic means for moving the free wheeling clutch lock-up element 35 whenever the gear ratios of the change-speed transmission are altered in order to automatically provide a one-way drive between the shafts 12 and 32 whenever the transmission is in neutral. This construction permits immediate synchronization of the gears of the transmission and eliminates gear clash when the gears are shifted to provide different gear ratios as will be hereinafter more fully described.

As stated in the objects of the invention, my improved free wheeling clutch is also provided with a manual control means and to this end I have provided a vertical shaft 43 reciprocally mounted in suitable guides provided in the casing 31. This shaft 43 extends above the top of the free wheeling clutch casing and is provided upon either side of the cover of the casing with suitable abutments to limit the reciprocal movement thereof. A coiled compression spring 43' surrounds the shaft between the top of the cover and the uppermost abutment to resiliently maintain the shaft 43 in its uppermost position, and upon the top of the shaft I have provided a knob or button 44 for manual actuation of the shaft. The shifter fork 36 is provided at the upper portion thereof with an outwardly extending forked abutment or bell crank 45, the outer portion of which straddles the lower portion of the shaft 43. An abutment 46 is slidably mounted upon the shaft 43 above the bell-crank 45 and is adapted to contact with the upper surface of the bell-crank 45 upon downward movement of the shaft 43. A fixed abutment 48 is provided on the shaft 43 above the sliding abutment 46 and a coiled compression spring 52 surrounds the shaft between the two abutments to resiliently maintain the abutment 46 in its lowermost position. From this construction it will be observed that when the shaft 43 is in its lowermost position the abutment 46 bears upon the top of the bell-crank arm 45 and tends to move the lower end of the shifter fork 36 and the member 35 to the right, as viewed in Figure 5, and to resiliently maintain the shifter fork and member 35 in this position by the tension of the coiled spring 52. It should be explained at this point in connection with the construction illustrated in Figure 4, that the combined strength of the springs 37 and 52 is sufficient to overcome the force of the spring 41 and maintain the lower end of the shifter fork 36 and the member 35 in its furthermost right-hand position regardless of the movement of the shifter rods 21 and 28.

In order to releasably maintain the shaft 43 in its lowermost position, I have provided a pivoted latch member 47 mounted on a trunnion fixed to the casing 31 and urged into latching engagement with the abutment 48 by means of the tension spring 49. To release the latch 47 and permit the shaft 43 to assume its uppermost position, I have provided a link member 55 pivotally connected at one end to the engine clutch pedal 56 and connected at its other end by means of a lost-motion connection comprising a slot 58 in a clevis attached to the end of the link 55, and a pin 57 extending through the upper end of the latch 47, so that the movement of the clutch pedal 56 slightly beyond the movement necessary to release the main engine clutch will release the latch 47 to permit the shaft 43 to rise under the resilient urge of the spring 43', thereby removing the pressure of the spring 52 from the bell-crank lever 45 and in turn permitting a movement of either of the shifter rods 21 or 28 from its neutral position to return the free wheeling lock-up element 35 to its left-hand position, as viewed in Figures 3 and 5.

To provide for automatically locking up the free wheeling clutch whenever the change-speed transmission is shifted into reverse gear regardless of the position of the manual operating means, it will be observed from an inspection of Figure 3 that the forward cam face in the shifter rod 28 is higher than the corresponding forward cam face in the shifter rod 21, thus moving the pin 39 through a larger arc whenever the shifter rod 28 is moved rearwardly from the position shown in Figure 3, to mesh the gear 25 with the idler pinion 26, to thus provide reverse drive. As particularly illustrated in Figures 1, 3 and 4, the member 38 is provided with an abutment 50, and the shifter fork 36 is provided with a corresponding abutment 51, whereby upward movement of the pin 39 and consequent rotation of the member 38 through an arc greater than the arcuate distance between the abutments 50 and 51 will cause the abutment 50 to contact with the abutment 51 and force the shifter fork 36 to rotate against the pressure of the springs 37 and 52 whenever the shifter rod 28 is moved rearwardly even though the manual control shaft 43 be latched in its lowermost position.

Figure 2:
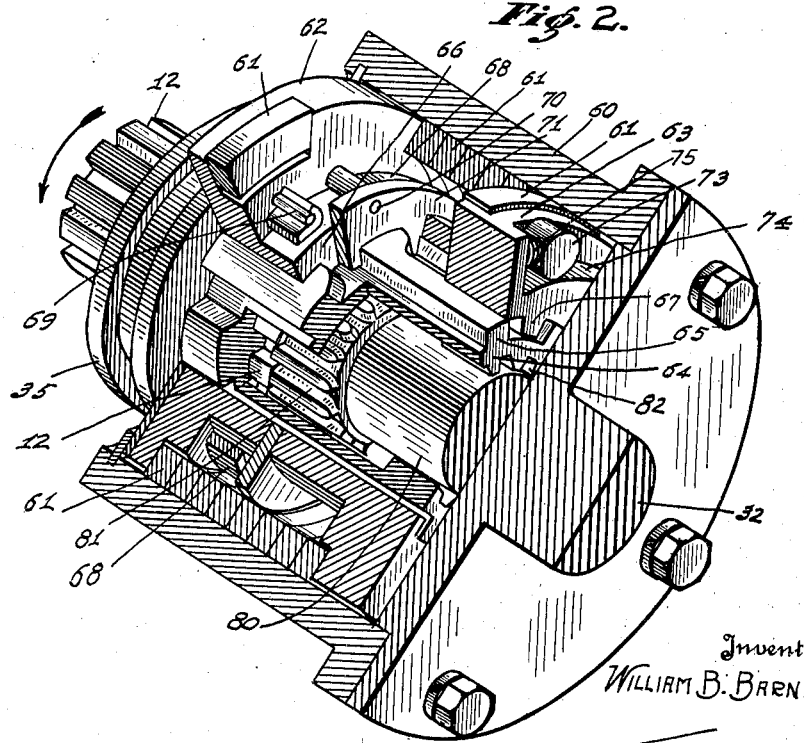
Figure 2 is an isometric view of a preferred form of free wheeling clutch constructed according to the idea of this invention, portions being broken away to better illustrate the construction thereof.

The construction of the free wheeling clutch illustrated in detail in Figures 2 and 3 will now be described, bearing in mind the free wheeling and synchronizing functions of the clutch as stated above, namely; that, with the manual control device in its uppermost or inoperative position, and both of the shifter rods 21 and 28 in neutral position, the lock-up device 35 will be maintained in its right-hand position as illustrated in Figure 2 by the action of the spring 37, but will be moved to the left whenever either of the shifter rods is moved out of neutral position; further, that with the manual control device latched in its lowermost or operative position, the lock-up device is maintained in its right-hand position as illustrated in Figure 3 by the action of the manual control whenever either of the shifter rods is moved to any forward speed position; and finally, that when the shifter rod 28 is moved rearwardly to establish reverse drive the lock-up device 35 is moved to the left from the position illustrated in Figure 3 against the action of the manual control by contact of the abutments 50 and 51.

Referring now to Figure 2, the rear end of the shaft 12 is provided with longitudinal splines and the member 35, which comprises a shift collar and an elongated sleeve portion extending axially outward from the shift collar, is slidably mounted upon these splines to rotate with the shaft 12. The shaft 32 is provided with a cylindrical cup 60 which rotates therewith and overlies the sleeve portion of the member 35. Within the cup 60 there is a helical multiple-wound clutch spring 61, preferably of rectangular cross-section, which bears at its opposite ends against abutments provided in spring actuating members 62 and 63 mounted on the sleeve portion of the member 35. The sleeve portion 64 of the member 35 is provided with interior splines, for a purpose to be later described, and with exterior splines 65, the spaces between the splines 65 being wider at the right-hand end of the sleeve than at the left-hand end thereof, the wider portions being divided from the narrower portions by rounded offsets in the splines. The spring actuating member 62 is provided internally thereof with a series of teeth, one of which is indicated at 66, which with the member 35 in the position illustrated in Figure 2, fit in the grooves between the wider face portions of the splines 65 and are of substantially the same width as the grooves between these splines. The wide faced spring actuating member 63 is provided with a corresponding set of teeth, one of which is indicated at 67, which lie in the wider portions of the grooves between the narrower portions of the splines 65 and are narrower than the portions of the grooves into which they project. The spring actuating member 62 is also provided with a laterally projecting sleeve portion which is surrounded by a spring ring 68, one end of which is secured to a pin 69 projecting outwardly from the member 62 over the sleeve portion thereof, the other end of the spring 68 being secured to a pin 70 mounted in a washer 71 disposed between the spring actuating members 62 and 63 and provided with teeth which fit into the grooves between the splines 65 to maintain the washer against rotation upon the sleeve portion of the member 35.

Still referring to Figure 2, the action of the spring ring 68 is such as to tend to unwind the clutch spring 61 and bring the outer surface of the clutch spring into initial frictional engagement with the interior surface of the cup 60. The spring actuating member 63 is provided with a form of one-way clutch which, in the embodiment of the device illustrated, comprises one or more rollers 73 mounted upon the cam surface 74 provided in the spring actuating member 63, the rollers being adapted to wedge between the cam surfaces 74 and the interior of the cup 60 upon rotation of the cup in a clockwise direction or in a direction opposite to that indicated by the arrow, as illustrated in Figure 2, and cause the cup 60 and the spring actuating member 63 to rotate together. If desired, coiled springs 75 may be utilized to urge the rollers into initial wedging position.

From the construction so far described, it will be observed that when the member 35 is in its right-hand position as illustrated in Figure 2, the spring actuating member 62 is held in such a position relative to the washer 71 by the wider portion of the splines 65 as to place the spring ring 68 under tension and prevent the reactive force of this spring from tending to unwind the main clutch spring 61. In this position of the parts, when the shaft 12 rotates in the direction of the arrow on Figure 2, relative to the cup 60, the rollers 73 will engage between the cam surfaces 74 and the interior surface of the cup 60 to prevent rotation of the spring actuating member 63 relative to the cup 60. As the rotation of the shaft 12 in the direction of the arrow continues, the clutch spring 61 will be unwound into clutching engagement with the interior of the cup 60 and a driving connection will be established from the shaft 12 through the member 35, the spring actuating member 62, the clutch spring 61, and the cup 60 to the shaft 32. If the speed of rotation of the cup 60 in the direction of the arrow indicated on Figure 2, becomes greater than the rotational speed of the shaft 12 in the same direction, that is, if the cup 60 tends to overrun the shaft 12 in the same direction of rotation, the rollers 73 will be moved into the deeper portion of the cams 74, thereby releasing the spring actuating member 63 from its driving engagement with the cup 60 and permitting the spring 61 to wind up out of engagement with the cup 60, whereupon the cup 60 will rotate relative to the shaft 12 at a higher speed in the same direction of rotation.

When the member 35 is moved to the left from the position viewed in Figure 2, the teeth 66 on the spring actuating member 62 as well as the teeth 67 on the spring actuating member 63 will be in the wider portions of the grooves between the splines 65, whereupon the spring ring 68 will act to rotate the spring actuating member 62 relative to the spring actuating member 63, thereby unwinding the spring 61 into frictional engagement with the interior of the cup 60. In this position of the parts, the shaft 12 will drive the cup 60 in the direction of the arrow on Figure 2 in the manner described above. However, if the rotational speed of the cup 60 tends to exceed the rotational speed of the shaft 12 in the direction of the arrow, the spring 61 will be unwound into clutching engagement with the interior surface of the cup from the end thereof which bears against the actuating member 62 and power will be transmitted from the cup 60 through the spring 61, spring actuating member 63, and the member 35 to the shaft 12, thereby providing a two-way drive between the shafts 12 and 32.

To secure a positive two-way drive between the shafts 12 and 32, in addition to the construction described above I have provided within the cup 60 an axial extension 80 of the shaft 32 which projects into the sleeve portion 64 of the member 35 and is provided adjacent to its ends with splines 81 adapted to engage with corresponding splines 82 formed in the interior of the sleeve portion of the member 35 when the member 35 is moved to the left from the position in Figure 2. It will be noted that a space is provided between the adjacent ends of the splines 81 and 82 so that upon movement of the member 35 to the left from the position in Figure 2, a timed interval will be provided to permit the teeth 66 to move into the wide slots between the splines 65 so that the clutch spring 61 will unwind to grip the cup 60 and the related parts of the clutch mechanism will have an opportunity to synchronize the speed of the shaft 12 and the cup 60 so that the splines 81 and 82 may engage without clash.

Figure 5:
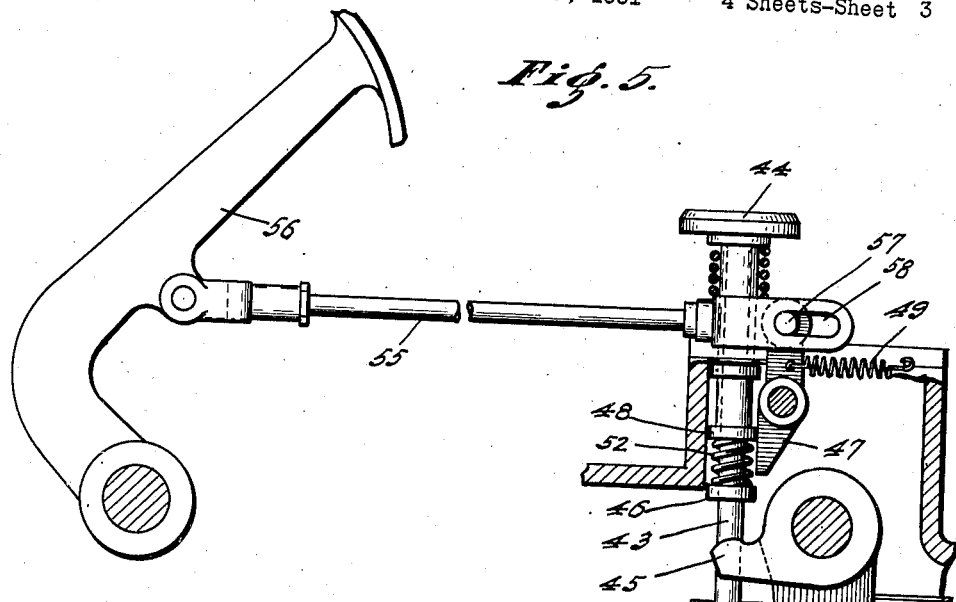
Figure 5 is a longitudinal sectional view of a fragmentary portion of the lock-up mechanism taken on the line 5—5 of Figure 4.

To further insure a sufficient time interval between the initial engagement of the spring 61 with the cup 60 and the engagement of the splines 81 and 82, I have provided a retarding means illustrated in Figures 4 and 5, which comprises a dash-pot 85 mounted in the casing 31 of the free wheeling clutch and provided in the lower portion thereof with one or more restricted apertures 87. A plunger 86 is reciprocally mounted in the dash-pot 85 and urged to its uppermost position by a coiled compression spring 88. The lower end of one portion of the shifter fork 36 is provided with a cam portion 89 adapted to ride over the top of the plunger 86. This cam portion, however, cannot ride over the top of the plunger until the plunger has been depressed a sufficient amount and as depression of the plunger 86 requires that a certain amount of fluid contained in the dash-pot be forced through the restricted apertures 87, it is apparent that contact of the cam 89 with the top of the plunger 86 will retard the motion of the shifter fork 36 and insure a definite time interval between the engagement of the spring 61 with the cup 60 and the engagement of the splines 81 and 82, whereby the cup 60 will be synchronized with the shaft 12 and there will be no clash of these splines. To provide fluid for the dash-pot 85 I contemplate that the casing 31 will at all times be partially filled with some lubricating medium above the level of the port 87.

In Figure 6 I have shown a somewhat modified controlling arrangement for my improved free wheeling clutch. In this construction a lever arm 36' is mounted exteriorly of the casing 31 upon the pivotal axis of the shifter fork 36 described above and is adapted to swing the shifter fork upon rotational movement thereof. A coiled spring 90 connected to the arm 36' tends at all times to resiliently urge the shifter fork to move the member 35 to the right or to its free wheeling position. A link 91 is connected at one end to the lower end of the arm 36' by means of a lost-motion connection 92 and is connected at its opposite end to the engine clutch pedal 56, so that the shifter fork 36 will be moved to shift the member 35 to its left-hand or clutch locking position only when the clutch pedal 56 has been depressed beyond the extent necessary to disengage the main engine clutch.

To provide an automatic and manual control for the free wheeling clutch element, I have provided two latching devices 93 and 94, both of which are adapted to engage an extension 95 formed on the arm 36' above the pivotal mounting thereof. A coiled compression spring 96 disposed between the latch 93 and a suitable abutment serves to resiliently maintain the latch 93 out of locking engagement with the extension 95. The force of this spring is overcome, however, and the latch 93 moved to locking engagement with extension 95 whenever the shifter rod 28 is moved rearwardly to place the transmission in reverse drive. Normally a portion of the latch 93 rides upon the top of the extension 95 and the latch therefore cannot be moved until the lever 36' has been rotated to lock-up position. In this connection, the space between the rear end of the shifter rod 28 and the forward face of the latch 93 is such that the transmission cannot be engaged in reverse gear until the clutch pedal 56 has been depressed a sufficient amount to move the extension 95 from beneath the latch 93 and to place the free wheeling clutch in lock-up position.

Figure 9:
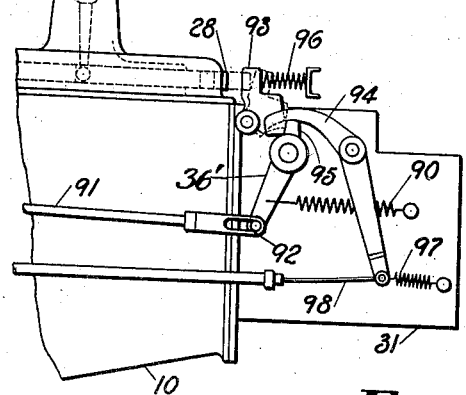
Figure 9 is a side elevational view similar to Figure 6, showing the manual control for the free wheel clutch in operative or two-way drive position.

I have provided a manual control for the free wheeling clutch which comprises the latch member 94 mentioned above, and a lever pivotally mounted upon the side of the casing 31 and resiliently urged into locking engagement with extension 95 by the coiled tension spring 97 as illustrated in Fig. 9. The force of the spring 97 may be overcome and the latch 94 held out of latching engagement with the extension 95 by means of a cable 98 which extends from the lower end of the latch 94 to some position convenient to the operator of the vehicle, such as the instrument board of the vehicle, and is there provided with a manual control knob 99 so that when the knob 99 is pulled outwardly the latch 94 will not engage with the extension 95 and free wheeling is permitted.

From the above described construction it will be apparent that when the knob 99 is pulled outwardly, a one-way or free wheeling drive for the vehicle will be maintained at all times except when the vehicle is moved in reverse, and that when the knob 99 is moved inwardly a two-way drive for the vehicle will be maintained at all times after the clutch pedal 56 has been depressed a sufficient amount to permit latching of the extension 95 by the latch 94.

While I have illustrated and described a preferred mechanical embodiment of the idea of my invention and a somewhat modified form thereof, it is to be understood that the invention is not limited to the specific mechanical features illustrated and described and that such changes in the size, shape and arrangement of parts may be resorted to as come within the scope of the sub-joined claims.

Having now described my invention so that others skilled in the art may clearly understand the same, what I desire to secure by Letters Patent is as follows:

1. A motor vehicle drive comprising, a pair of aligned shafts, means affording a one-way drive connection between said shafts, clutch means on one of said shafts shiftable in one direction to synchronize the speed of said shafts and to provide a two-way drive connection between said shafts, and positive means operative upon a further shifting of said second means in the same direction to provide an additional two-way driving connection between said shafts.

2. A device of the type described comprising, a pair of aligned shafts, one of said shafts having a cup formed on the end thereof, a spring within said cup affording a one-way drive connection between said shafts, and means on the other of said shafts shiftable in a single direction to cause said spring to provide a two-way drive between said shafts to synchronize the speed of said shafts and to provide a two-way drive connection between said shafts independent of said spring.

3. A device of the type described comprising, a pair of aligned shafts, one of said shafts having a cup formed on the end thereof, means within said cup affording a one-way drive connection between said shafts, and keys on the other of said shafts shiftable in a single direction to cause said means to provide a two-way drive between said shafts, to synchronize the speed of said shafts, and to provide a two-way drive connection between said shafts independent of said means.

4. A device of the type described comprising, driving and driven shafts, a cup formed on one of said shafts, a helical spring within said cup, actuating means mounted on the other of said shafts operable to expand said spring into engagement with said cup, and means operatively engageable with said actuating means to synchronize the speed of said shafts and to provide a two-way drive between said shafts.

5. In a motor vehicle drive, a clutch mechanism comprising an expansible spring clutching element for providing a one-way drive through said clutch, manually and automatically actuable means for rendering said spring effective to establish a two-way drive through said clutch, positive clutch means for maintaining a two-way drive through said clutch, and a dash-pot for interposing a time interval between the engagement of said spring clutch element to provide a two-way drive and the engagement of said positive clutch means.

6. A free-wheeling clutch comprising, relatively rotatable driving and driven members, self-energizing expandable clutch means operating between said two members and opposing their relative rotation in one direction while permitting free relative rotation in the other direction, positive clutch means also operable between said two members to prevent their relative rotation in both directions, and means for interposing a time interval between the engagement of said expansible clutch means and the engagement of said positive clutch means.

WILLIAM B. BARNES.